(12) United States Patent
Yoshihara et al.

(10) Patent No.: US 7,355,760 B2
(45) Date of Patent: Apr. 8, 2008

(54) SOLID-STATE IMAGE SENSING DEVICE, DRIVING METHOD THEREOF, AND IMAGE SCANNER

(75) Inventors: Satoshi Yoshihara, Fukuoka (JP); Masahide Hirama, Fukuoka (JP); Yoshinori Kuno, Fukuoka (JP)

(73) Assignee: Sony Corporation, Tokyo (JP)

( * ) Notice: Subject to any disclaimer, the term of this patent is extended or adjusted under 35 U.S.C. 154(b) by 798 days.

(21) Appl. No.: 10/022,708

(22) Filed: Dec. 13, 2001

(65) Prior Publication Data

US 2002/0145675 A1 Oct. 10, 2002

(30) Foreign Application Priority Data

Dec. 15, 2000 (JP) .......................... P2000-381273

(51) Int. Cl.
*H04N 1/04* (2006.01)

(52) U.S. Cl. ..................... 358/474; 358/514; 358/513; 358/512; 250/208.1

(58) Field of Classification Search ................ 358/474, 358/505, 513, 514, 408, 413, 482, 483, 494, 358/516, 518, 410, 411, 412; 250/208.1; 348/311, 314
See application file for complete search history.

(56) References Cited

U.S. PATENT DOCUMENTS

| | | | | |
|---|---|---|---|---|
| 4,376,888 A | * | 3/1983 | Fukuda et al. | 250/214 R |
| 4,541,411 A | * | 9/1985 | Woolf | 126/390.1 |
| 4,949,189 A | * | 8/1990 | Ohmori | 358/474 |
| 5,041,859 A | * | 8/1991 | Ishiguro et al. | 396/123 |
| 5,043,817 A | * | 8/1991 | Kinugasa et al. | 348/240.02 |
| 5,105,264 A | * | 4/1992 | Erhardt | 348/282 |
| 5,136,370 A | * | 8/1992 | Chi | 348/279 |
| 5,302,543 A | * | 4/1994 | Sakakibara | 438/146 |
| 5,408,113 A | * | 4/1995 | Kanno et al. | 257/292 |
| 5,539,536 A | * | 7/1996 | Maki et al. | 358/483 |
| 5,668,597 A | * | 9/1997 | Parulski et al. | 348/350 |
| 5,852,502 A | * | 12/1998 | Beckett | 358/512 |
| 5,887,087 A | * | 3/1999 | Tamagawa et al. | 382/312 |
| 5,929,432 A | * | 7/1999 | Yamakawa | 250/208.1 |
| 6,169,576 B1 | * | 1/2001 | Monoi | 348/272 |
| 6,704,461 B1 | * | 3/2004 | Yamamoto | 382/298 |
| 6,765,616 B1 | * | 7/2004 | Nakano et al. | 348/322 |
| 6,909,521 B1 | * | 6/2005 | Murakami | 358/1.2 |
| 7,187,411 B2 | * | 3/2007 | Yamada | 348/314 |
| 7,196,303 B2 | * | 3/2007 | Tsunai | 250/208.1 |
| 2005/0067640 A1 | * | 3/2005 | Ohkawa | 257/291 |
| 2005/0077554 A1 | * | 4/2005 | Rhodes | 257/291 |

* cited by examiner

*Primary Examiner*—Aung S. Moe
*Assistant Examiner*—Negussie Worku
(74) *Attorney, Agent, or Firm*—Robert J. Depke; Rockey, Depke & Lyons, LLC.

(57) ABSTRACT

A CCD linear sensor includes a monochrome sensor and a color sensor, which have different transfer speeds and which are mounted on the same chip. In the CCD linear sensor, while one read-out operation is performed by the color sensor, two read-out operations are performed by the monochrome sensor. During the second read-out period of the monochrome sensor, by stopping the generation of two-phase transfer pulses to be supplied to the transfer registers of the color sensors during a predetermined period of time before and after the second read-out pulse occurs, the transfer operation of the transfer registers of the color sensors is stopped.

14 Claims, 5 Drawing Sheets

SOLID-STATE IMAGE SENSING DEVICE, DRIVING METHOD THEREOF, AND IMAGE SCANNER

RELATED APPLICATION DATA

The present application claims priority to Japanese Application(s) No(s). P2000-381273 filed Dec. 15, 2000, which application(s) is/are incorporated herein by reference to the extent permitted by law.

BACKGROUND OF THE INVENTION

1. Field of the Invention

The present invention relates to a solid-state image sensing device, a driving method thereof, and an image scanner. More particularly, the present invention relates to a solid-state image sensing device which has a plurality of groups of sensors having different reading periods of signal charge from a pixel line, a driving method thereof, and an image scanner to which the solid-state image sensing device is applied.

2. Description of the Related Art

CCD (Charge Coupled Device) linear sensors, which are composed of solid-state image sensing devices arranged in a one-dimensional array, have been used as image sensors of image scanners in image-input devices such as digital-color copying machines and facsimiles, and as image sensors of image scanners in order to input images for display by personal computers and so on.

Here, when giving an example of a case where the CCD linear sensor is used as an image sensor of an image-input device of digital-color copying machine, for color documents, the image sensor performs image sensing relatively slowly in order to increase color reproduction, whereas, for monochrome documents, the image sensor performs high-speed image sensing in order to increase the copying speed. In such a case, a plurality of groups of sensors which have different transfer speeds are arranged on the same chip.

Specifically, as shown in FIG. 4, a well-known CCD linear sensor has a structure in which, as a monochrome sensor 100, one pixel line (sensor line) 101 having transfer registers 102$o$ and 102$e$ at both sides thereof is arranged, and as a color sensor 200, individual pixel lines 210R, 201G, and 201B, corresponding to R (red), G (green), and B (blue), respectively, having transfer registers 202R, 202G, and 202B, respectively, are arranged.

In the monochrome sensor 100, between the pixel line 101 and two transfer registers 102$o$ and 102$e$, there is a read-out gate 103$o$, which reads the signal charge from the odd-numbered pixels in the pixel line 101 to one of the transfer registers 102$o$, and there is a read-out gate 103$e$, which reads the signal charge from the even-numbered pixels in the pixel line 101 to one of the transfer registers 102$e$. Also, output parts 104$o$ and 104$e$ and output circuits 105$o$ and 105$e$ are arranged at the respective output sides of the transfer registers 102$o$ and 102$e$.

In the color sensor 200, between each of the pixel lines 201R for R, 201G for G, and 202B for B, and the transfer registers 202R, 202G, and 202B, respectively, there are read-out gates 203R, 203G, and 203B, which read the signal charge from the pixels of the pixel lines 201R, 201G, and 201B to one of the transfer registers, 202R, 202G, and 202B, respectively. Also, output parts 204R, 204G, and 204$b$, and output circuits 205R, 205G, and 205B are arranged at the respective output sides of the transfer registers 202R, 202G, and 202B.

In the CCD linear sensor having the structure described above, two-phase transfer pulses $\phi$H1$b$ and $\phi$H2$b$ are applied to each transfer stage of the transfer registers 102$o$ and 102$e$ of the monochrome sensor 100, a transfer pulse $\phi$LHb is applied to the final transfer stage in the vicinity of the output parts 104$o$ and 104$e$, and a read-out pulse $\phi$ROG2 is applied to the read-out gates 103$o$ and 103$e$. Thus, output signals Vout-odd and Vout-even are output from the output circuits 105$o$ and 105$e$, respectively.

Also, two-phase transfer pulses $\phi$H1$c$ and $\phi$H2$c$ are applied to each transfer stage of the transfer registers 202R, 202G, and 202B of the color sensor 200, a transfer pulse $\phi$LHc is applied to the final transfer stage in the vicinity of the output parts 204R, 204B, and 204B, and a read-out pulse $\phi$ROG1 is applied to the read-out gates 203R, 203G, and 203B. Thus, output signals Vout-R, Vout-G, and Vout-B are output from the output circuits 205R, 205G, and 205B, respectively.

FIG. 5 illustrates the timing relationship among each of the timing pulses. Usually, in order to simplify the driving system, the pulses $\phi$H1$b$ and $\phi$H1$c$ are produced by one pulse, and the pulses $\phi$H2$b$ and $\phi$H2$c$ are produced by another pulse. Thus, in the monochrome sensor 100, the signal charge of each pixel of the pixel line 101 is read separately into odd and even sides, that is, the transfer registers 102$o$ and 102$e$. Consequently, the transfer speed of the transfer registers 102$o$ and 102$e$ is the same as that of the color registers 202R, 202G, and 202B, and the transfer time is half that of the color side.

Specifically, since the monochrome sensor 100 has two transfer registers 102$o$ and 102$e$, thus one frame time is half that of the color sensor 200. Here, one frame time means the repetition period of the read-out pulses $\phi$ROG1 and $\phi$ROG2. In the monochrome sensor 100, since one frame time is half that of the color sensor 200, it is possible to perform a high-speed read operation, and two read/transfer operations are possible during the period for one read/transfer operation by the color sensor 200, thus the resolution of the monochrome sensor 100 in the sub-scanning direction (in the direction perpendicular to the pixel line 101) can be twice that of the color sensor.

However, as described above, in the CCD linear sensor which includes two groups of sensors, that is, the sensors 100 and 200 having different transfer speeds, as is apparent from the timing chart in FIG. 5, during the transfer period of signal charge in the color sensor 200, a read operation of signal charge is performed in the monochrome sensor 100. Thus when the sensors 100 and the sensors 200 are located close to each other, in particular, when the sensors 100 and the sensors 200 are mounted on the same chip, there is a possibility that noise might be added to the pixel signal of the color sensor by the influence of the read-out pulse $\phi$ROG2 when the pulse is generated.

In order to avoid the above, it is necessary to supply the transfer pulses $\phi$H1$b$ and $\phi$H2$b$ of the monochrome side, and the transfer pulses $\phi$H1$c$ and $\phi$H2$c$ of the color side with separate timings. In this case, the structure of the driving system, such as the timing generator for producing the transfer pulses $\phi$H1$b$ and $\phi$H2$b$ and the transfer pulses $\phi$H1$c$ and $\phi$H2$c$, becomes complicated. Moreover, this results in increased cost.

SUMMARY OF THE INVENTION

The present invention is made in view of the foregoing, and an object is to provide a solid-state image sensing device in which the output signal of one of the sensors is not influenced by the noise of the read-out pulse of the other sensor when read-out of the signal charge is performed at different timings among the plurality of group of sensors, and a driving method thereof, and an image scanner to which the solid-state image sensing device is applied.

In the solid-state image sensing device according to the present invention, the image sensing device includes a plurality of groups of sensors, each of the sensors includes a pixel line and a charge-transfer part for transferring signal charge to be read from each pixel of the pixel line; and driving means, in which when reading of the signal charge is performed at a different timing between the plurality of groups of sensors, during a reading period of one sensor, stopping transfer driving of the signal charge of the other sensor is performed. In addition, the solid-state image sensing device is applied to an image sensor for scanning document image in an image scanner.

In the solid-state image sensing device having the structure described above or the image scanner having an image sensor to which the image sensing device is applied, when the image sensing device includes sensors which perform reading of signal charge at different timing, during a reading period of one sensor, by stopping transfer driving of the signal charge of the other sensor, a valid pixel signal is not output from the other sensor during this period. As a result, the output signal of the other sensor is not influenced by the noise which arises from the read-out operations of one sensor.

DESCRIPTION OF THE PREFERRED EMBODIMENT

In the following, an embodiment of the present invention will be described with reference to the drawings.

Figure 1:
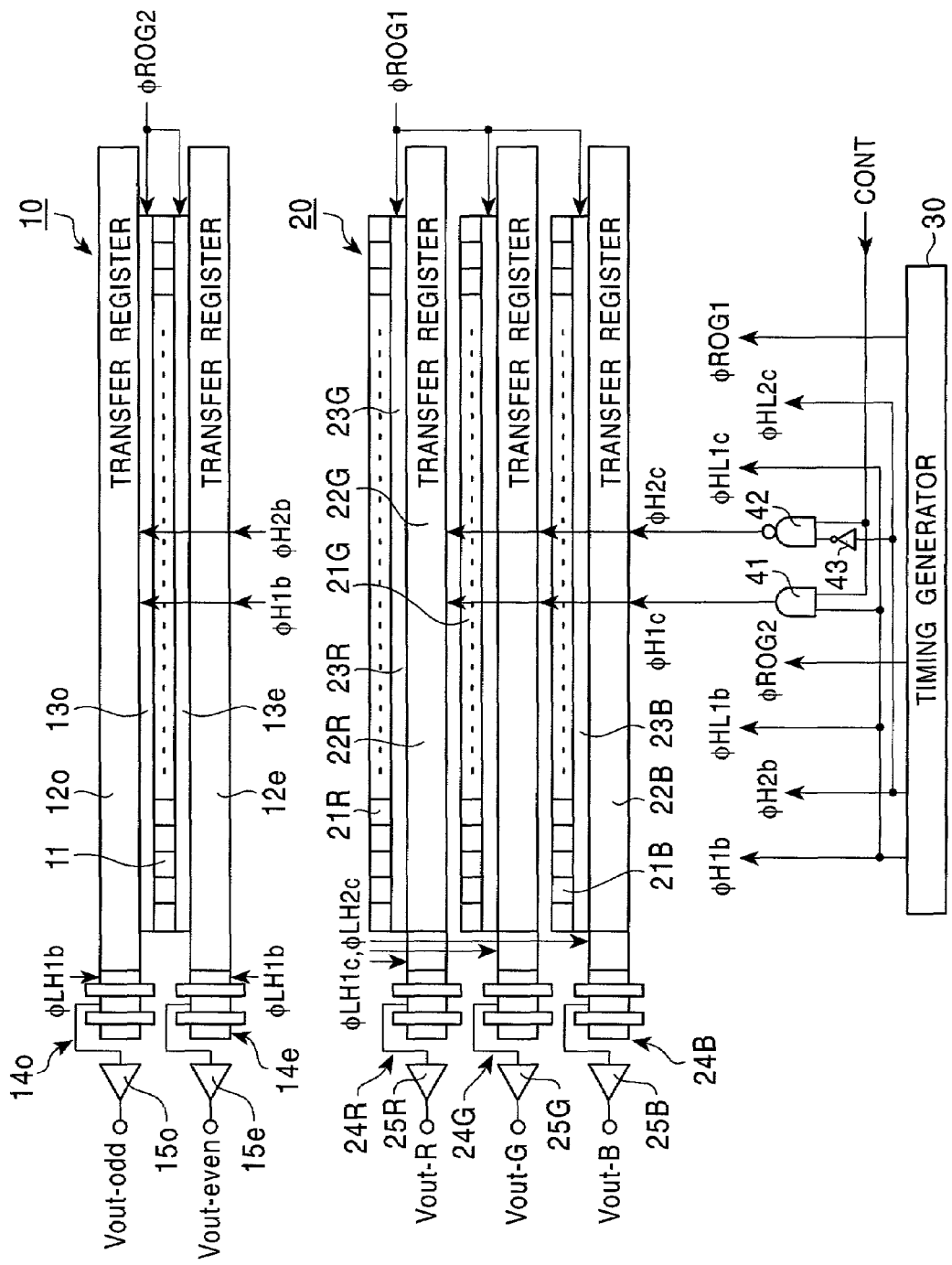
FIG. 1 is a schematic view illustrating an example block diagram of a CCD linear sensor according to an embodiment of the present invention.

FIG. 1 is a schematic view illustrating an example block diagram of a solid-state image sensing device, for example a CCD linear sensor, according to the embodiment of the present invention. The CCD linear sensor according to the embodiment has, for example, a structure in which a monochrome sensor 10 and a color sensor 20 are mounted on the same chip (substrate).

In FIG. 1, the monochrome sensor 10 has a structure including a pixel line (sensor line) 11, in which a plurality of pixels made of photoelectric conversion devices such as photo-diodes are arranged in one dimension, transfer registers 12o and 12e, each of which is made of CCDs arranged on both sides of the pixel line 11, and read-out gates 13o and 13e, which are disposed between the pixel line 10 and the two transfer registers 12o and 12e, the read-out gates 13o and 13e reading the signal charge from each pixel of the pixel line 11 into both transfer registers 12o and 12e at odd and even sides, respectively.

Also, at the output sides of the transfer registers 12o and 12e, there are arranged output parts (charge-detection parts) 14o and 14e, which detect the signal charge transferred by the transfer registers 12o and 12e and which have, for example, a floating-diffusion amplifier structure, and output circuits 15o and 15e, which convert the signal charge detected by the output parts 14o and 14e to output a voltage signal and which is formed of, for example, a source-forward circuit.

At the same time, the color sensor 20 has a structure including pixel lines 21R, 21G, and 21B, in which a plurality of individual pixels are arranged in one dimension, and which include color filters R (red), G (green), and B (blue) (not shown in the figure), transfer registers 22R, 22G, and 22B, which are arranged for corresponding pixel lines 21R, 21G, and 21B, read-out gates 23R, 23G, and 23B disposed between the pixel lines 21R, 21G, and 21B and the transfer registers 22R, 22G, and 22B. The read-out gates 23R, 23G, and 23B read the signal charge from each pixel of the pixel lines 21R, 21G, and 21B into the transfer registers 22R, 22G, and 22B, respectively.

At the output sides of the transfer registers 22R, 22G, and 22B, in the same manner as the case of the monochrome sensor 100, there are arranged output parts 24R, 24G, and 24B, which detect the signal charge transferred by the transfer registers 22R, 22G, and 22B and which have, for example, a floating-diffusion amplifier structure, and output circuits 25R, 25G, and 25B, which convert the signal charge detected by the output parts 24R, 24G, and 24B to output a voltage signal and which are made of, for example, a source-forward circuit.

In the CCD linear sensor according to the present embodiment having the structure described above, two-phase transfer pulses $\phi H1b$ and $\phi H2b$ are applied to each transfer stage of the transfer registers 12o and 12e of the monochrome sensor 10, a transfer pulse $\phi 4LHb$ is applied to the final transfer stage in the vicinity of the output parts 14o and 14e, and a read-out pulse $\phi ROG2$ is applied to the read-out gates 13o and 13e. Thus, output signals Vout-odd and Vout-even are output from the output circuits 15o and 15e, respectively.

Also, two-phase transfer pulses $\phi H1c$ and $\phi H2c$ are applied to each transfer stage of the transfer registers 22R, 22G and 22B of the color sensor 20, transfer pulses LH1c and $\phi LH2c$ are applied to a predetermined number (bit) of the transfer stages including the final transfer stage in the vicinity of the output parts 24R, 24B and 24B, and a readout pulse $\phi ROG1$ is applied to the read-out gates 23R, 23G and 23B. Thus, output signals Vout-R, Vout-G, and Vout-B are output from the output circuits 25R, 25G, and 25B, respectively.

As described above, the monochrome sensor 10 has two transfer registers 12o and 12e, thus one frame time of the monochrome sensor is half that of the color sensor 20. Therefore, it is possible to perform a high-speed read operation, and two read and transfer operations are possible by the monochrome sensor 10 during the period of one read and transfer operation by the color sensor 20. Thus the resolution of the monochrome sensor 10 in the sub-scanning direction (in the direction perpendicular to the pixel line 11) can be twice that of the color sensor.

In this regard, a timing generator 30 generates various kinds of timing pulses which include the transfer pulses $\phi H1b$ and $\phi H2b$, the transfer pulse $\phi LHb$, and the read-out pulse $\phi ROG2$ of the monochrome side, and furthermore, the transfer pulses φH1c and φH2c, the transfer pulses φLH1c and φLH2c, and the read-out pulse φROG1 of the color side. The timing generator 30 constitutes a driving system for driving the monochrome sensor 10 and the color sensor 20 together with a peripheral circuit including a driver (not shown in the figure).

Here, as an example, in order to simplify the circuit configuration of the timing generator 30, the two-phase transfer clocks φH1 and φH2 are to be shared between the monochrome side and the color side, that is, between the transfer pulses φH1b and φH2b of the monochrome side, and the transfer pulse φLHb and between the transfer pulses φH1c and φH2c of the color side, and the transfer pulses φLH1c and φLH2c.

However, in the CCD linear sensor according to the present embodiment, in the monochrome sensor 10, two read and transfer operations are performed during the period of one read and transfer operation by the color sensor 20. Thus the transfer operation of the transfer registers 22R, 22G, and 22B of the color sensor 20 is stopped during the second read-out period of the monochrome sensor 10, that is, for a predetermined period of time before and after the second read-out pulse φROG2 occurs. The stopping of the transfer operation can be achieved by not supplying the transfer pulses φH1c and φH2c to the transfer registers 22R, 22G, and 22B of the color sensor 20.

Specifically, a 2-input AND gate 41 and a 2-input NAND gate 42 are arranged at the output side of the timing generator 30. The transfer clock φH1, which is generated by the timing generator 30, is supplied to one input of the AND gate 41, and the transfer clock φH2 is inverted by the inverter 43 and is supplied to one input of the NAND gate 42. At the same time, a control pulse CONT, which becomes an "L" level during the period when the transfer operation of the transfer registers 22R, 22G, and 22B are stopped, is supplied to each of the other inputs of those gates.

Then each of the output pulses of the AND gate 41 and the NAND gate 42 are used for the transfer pulses φH1c and φH2c of the transfer registers 22R, 22G, and 22B. In this regard, a logical circuit, which is composed of the AND gate 41, the NAND gate 42, and the inverter 43, is used to generate the two-phase transfer pulses φH1c and φH2c based on the two-phase clocks φH1 and φH2: however, the logical circuit is not limited to this circuit configuration. For example, the circuit configuration may be such that an OR gate is used instead of the NAND gate 42, and the inverter 43 is inserted in the control pulse CONT.

With this arrangement, during the period when the control pulse CONT is at an "L" level, the transfer pulses φH1c and φH2c are not supplied to the transfer registers 22R, 22G, and 22B, thus it is possible to stop the transfer operations of the transfer registers 22R, 22G, and 22B of the color sensor 22 during the period of the second read-out of the monochrome sensor 10. In this regard, in this stopped period, for example, the transfer pulse φH1c is maintained at an "L" level state, and the transfer pulse φH2c is maintained as an "H" level state.

Figure 2:
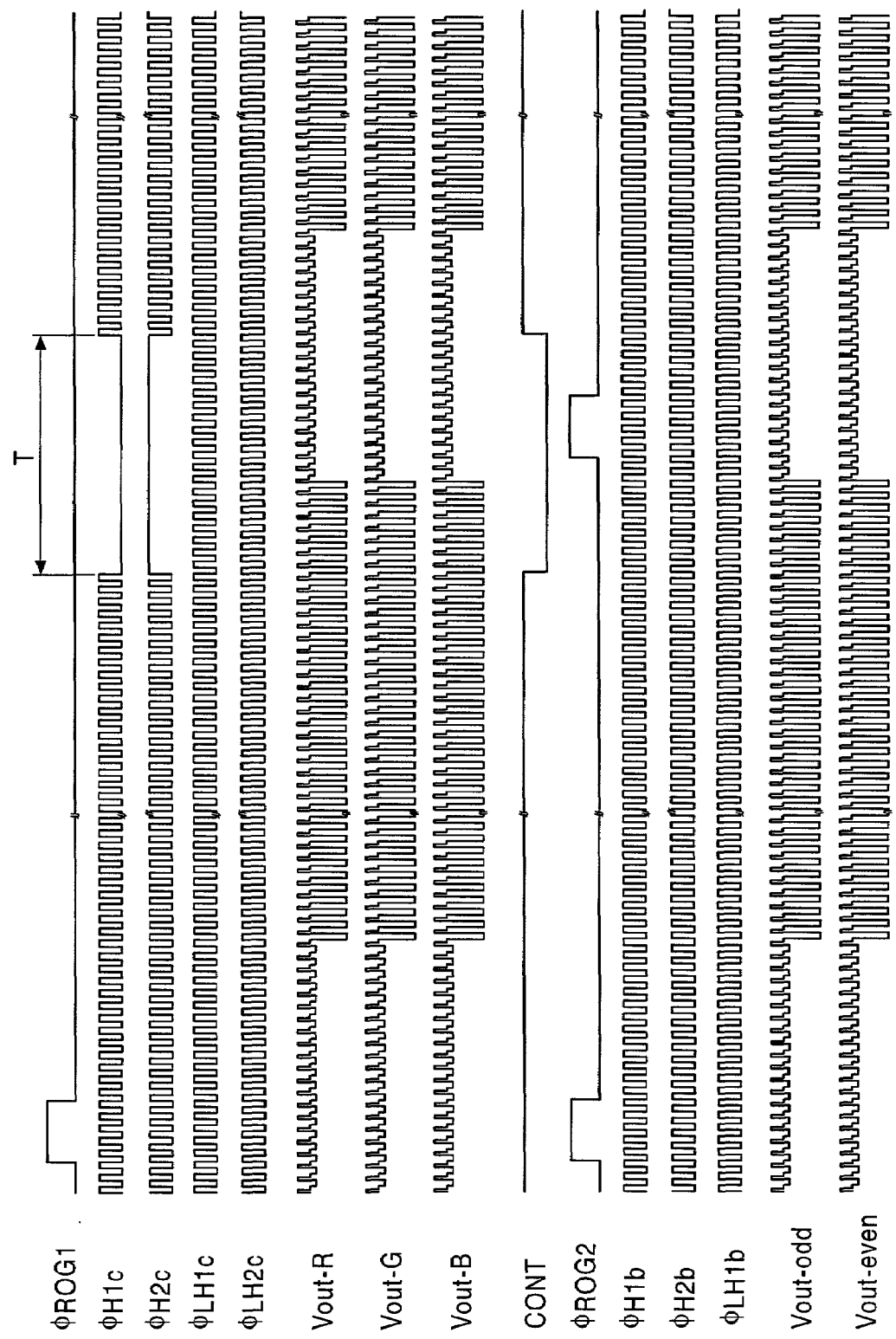
FIG. 2 is a timing chart illustrating the operation of the CCD linear sensor according to the embodiment of the present invention.

For the other timing pulses, that is, the transfer pulses φH1b and φH2b of the monochrome side, the transfer pulse φLHb, the transfer pulses φLH1c and φLH2c of the color side, the two-phase transfer clocks φH1 and φH2, which are generated by the timing generator, are used directly. FIG. 2 shows the timing relationship of each of the timing pulses. The timing chart obviously reveals that during the predetermined period T before and after the second read-out pulse φROG2 of the monochrome side occurs, generation of the transfer pulses φLH1c and φLH2c of the color side is stopped.

In this regard, here, stopping supply of the transfer pulses φH1c and φH2c for the transfer registers 22R, 22G, and 22B of the color side is achieved using the two AND gates 41 and 42, and the control pulse CONT assuming a configuration in which the two-phase transfer clocks φH1 and φH2 are to be shared between the monochrome side and the color side, that is, between the transfer pulses φH1b and φH2b of the monochrome side and the transfer pulse φLHb, and between the transfer pulses φH1c and φH2c of the color side and the transfer pulses φLH1c and φLH2c. However, the configuration is not limited to this. For example, the system can be configured such that the transfer pulses φH1c and φH2c, whose generation is stopped during the period of the second read-out of the monochrome side 10, can be generated separately by the timing generator 30.

As described above, in the CCD linear sensor having the structure in which the monochrome sensor 10 and the color sensor 20 with different transfer speeds are mounted on a chip, two read and transfer operations are performed in the monochrome sensor 10 during the period of one read and transfer operation by the color sensor 20; thus the transfer operation of the transfer registers 22R, 22G, and 22B of the color sensors 20 is stopped during the second read-out period of the monochrome sensor 10. Accordingly, an effective pixel signal is not output from the color sensor 20 during this period; thus it is possible to completely eliminate the influence of the noises, which originates from the second read-out pulse of the monochrome side, upon the output signals Vout-R, Vout-G, and Vout-B.

In this regard, even though the transfer operations of the transfer registers 22R, 22G, and 22B of the color side are stopped, the two-phase transfer pulses φLH1c and φLH2c continue to be applied to a predetermined number of the transfer stages, that is, the transfer stages for several bits, including the final transfer stage among the transfer registers 22R, 22G, and 22B. Thus the signal charge which exists in the transfer stages for several bits is transferred as is, and is output through the output parts 24R, 24B and 24B, and the output circuits 25R, 25G, and 25B.

After this, there is no signal charge in the transfer stages for several bits: however, the transfer pulses φLH1c and φLH2c are continuously applied. Thus in the transfer stages for several bits, the transfer is performed in the state where no signal charge exists, that is, dummy transfer is performed. Then after the period for which transfer of the transfer registers 22R, 22G, and 22B is stopped, the transfer operations are restarted at the transfer stages for several bits in the state where no signal charge exists, as is obvious from the timing chart shown in FIG. 2, the dummy signals, that is, black signals for several bits, are output, and then output of the output signals Vout-R, Vout-G, and Vout-B is restarted.

In this manner, by stopping the transfer operations of the transfer registers 22R, 22G, and 22B of the color side, as is obvious from the timing chart shown in FIG. 2, the effective pixel signal for one frame is cut off during the transfer. Also, in the stopped period, by performing dummy transfer in the transfer stage for several bits of the output parts 24R, 24B and 24B of the output circuits 25R, 25G, and 25B, dummy signals, that is, black signals, are inserted between the cut-off effective pixel signals.

The dummy signals are usually obtained, for example, by dimming the pixels at the end of the pixel line, and are used to decrease the influence of fluctuations of the black level of the output signals. As described above, by inserting the dummy signals between the effective pixel signals which are cut off, at the time of restarting the transfer of signal charge at the color side, it is possible to check the black reference using the dummy signal.

Here, the period for which the dummy signals are inserted, that is, the number of transfer stages (actually, determined by the period time of the transfer pulses φLH1c and φLH2c and the number of transfer stages) to which the two-phase pulses φLH1c and φLH2c are applied among the transfer registers 22R, 22G, and 22B, in other words, the stop period T of the transfer operations of the transfer registers 22R, 22G, and 22B of the color side, is arbitrarily set to the period before and after the second read-out pulse φROG2 of the monochrome side occurs.

However, as shown by the timing chart in FIG. 2, when the stop period T of the transfer operation is determined such that the timing of the signal output at the color side after the cut-off coincides with the timing of the second signal of the monochrome side, the two output signals of the color side which are cut off and the two output signals of the two read-out operations of the monochrome side can be output with the same phase; Thus there is an advantage in that signal processing in a signal processing system at a stage is simplified. The two output signals of the color side, which are cut off, can be combined easily by removing the dummy signals.

In this regard, in the embodiment described above, a description is given of the example of the CCD linear sensor having a structure in which the monochrome sensor 10 and the color sensor 20 are mounted on the same chip. However, the present invention is not limited to this, and can be applied to the case having a structure in which the monochrome sensor 10 and the color sensor 20 are located close to each other. Also, the present invention is not limited to the combination of the monochrome sensor and color sensor, but can be applied to the combination of two monochrome sensors, or two color sensors. In summary, it can be applied to a combination of sensors which have different read-out periods of the signal charge from the pixel line to the transfer registers.

Also, in the embodiment described above, a description is given that, while one read-out operation is performed by one of the sensors, two read-out operations are performed by the other sensor. However, the present invention is not limited to this, and can also be applied to the case where three of more read-out operations are performed. Specifically, in each of the second or subsequent read-out periods of the other sensor, the transfer operation of the first sensor can be stopped.

Furthermore, in the embodiment described above, a description is given of the example of the CCD linear sensor having a structure which has two sensors with different read-out periods of the signal charge. However, the present invention is not limited to this, and can be applied to the case of three or more sensors. Also, for an example of different read-out periods of the signal charge, a description is given of the case having transfer registers with different transfer speeds. However, the present invention can also be applied to the case having a pixel line (sensor line) with different pixel sizes.

The CCD linear sensor according to the present embodiment described above is preferably used, for example, for an image sensor of an image scanner in an image-input device such as a digital-color copying machine or a facsimile, and for an image sensor of an image scanner in order to input images for display by a personal computer and so on.

Figure 3:
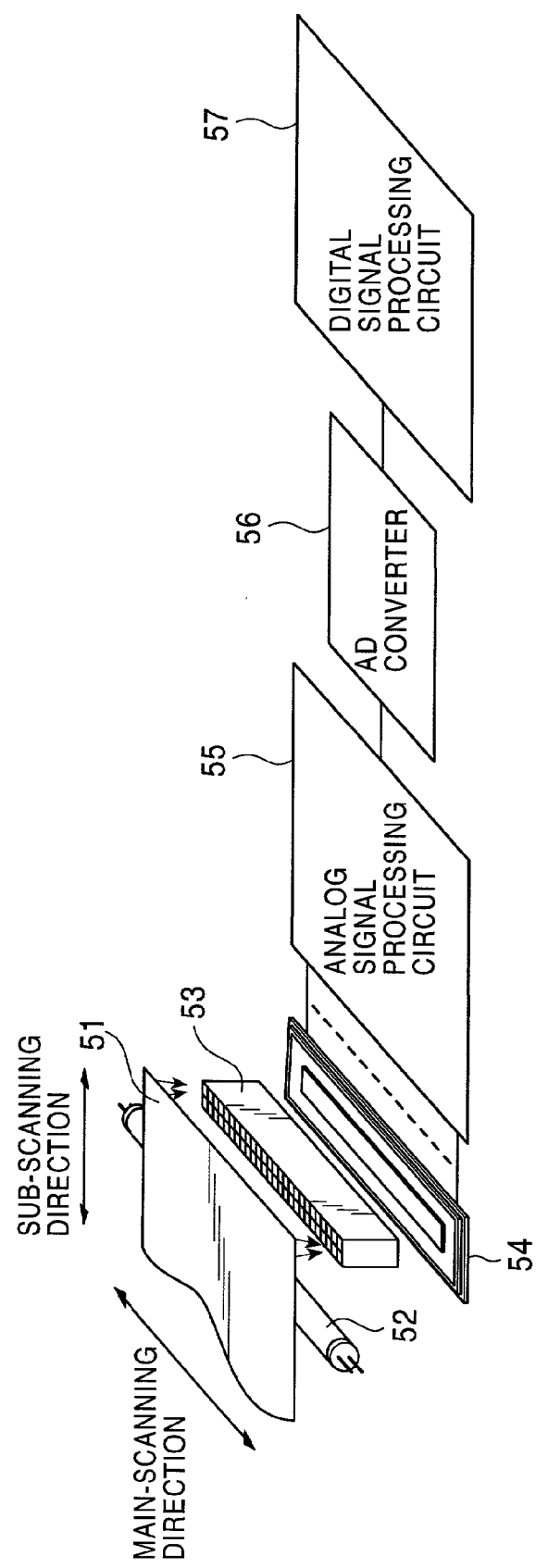
FIG. 3 is a schematic view illustrating an example configuration of a digital-color copying machine to which the present invention is applied.
Figure 4:
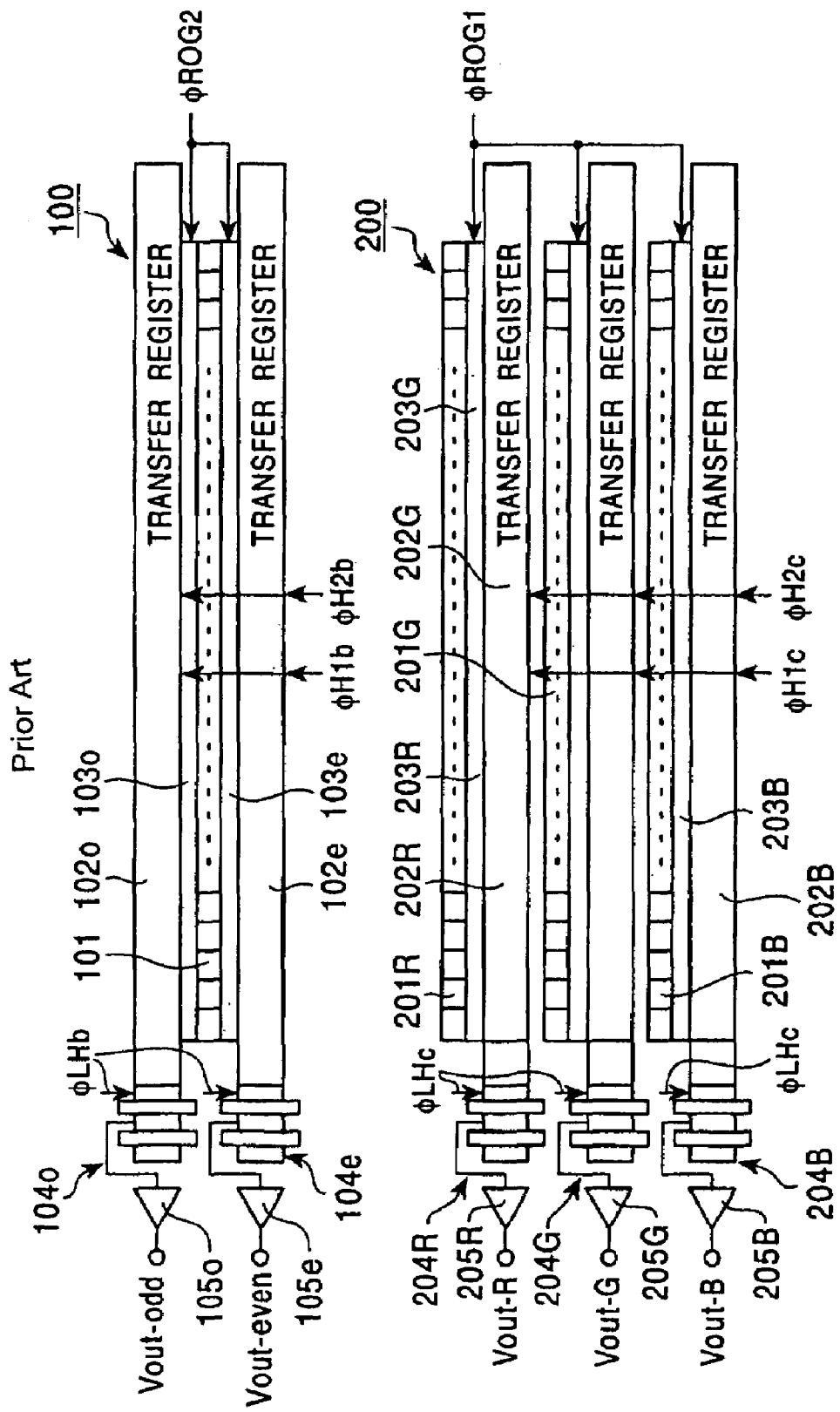
FIG. 4 is a schematic view illustrating an example block diagram of a conventional CCD linear sensor.
Figure 5:
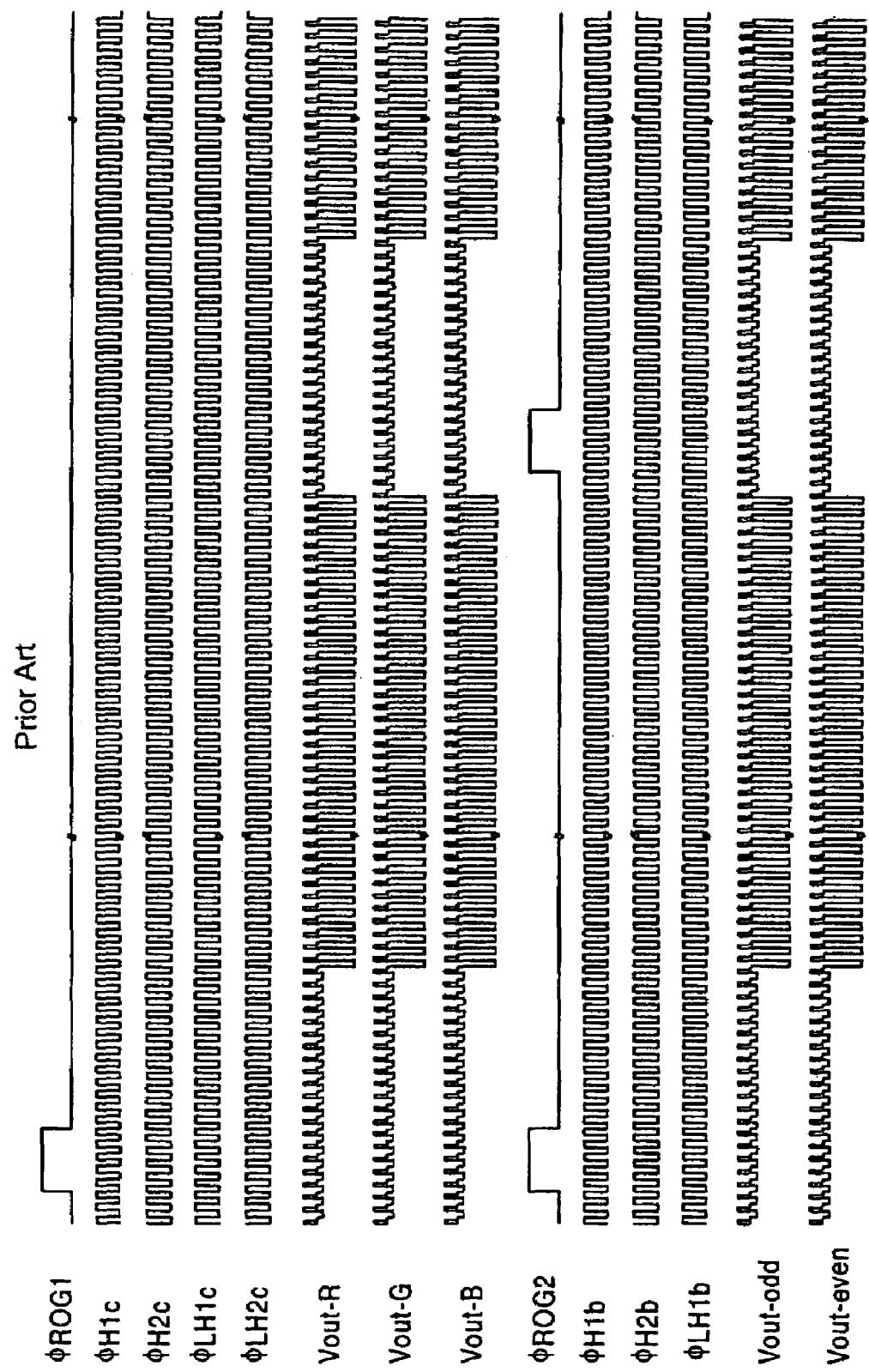
FIG. 5 is a timing chart illustrating the operation of the conventional CCD linear sensor.

FIG. 3 is a schematic view illustrating an example configuration of a digital-color copying machine. In FIG. 3, a document 51 to be copied is placed on the platen glass. A light source 52 is placed under the document 51, and the light which is emitted from the light source irradiates the image surface of the document 51. Then the reflected light is incident on the sensing surface of a CCD linear sensor 54 through an optical system 53 such as a lens.

Here, the longitudinal direction of the CCD linear sensor 54, that is, the direction of the pixel array line, is a main scanning direction, and the direction perpendicular to it is a sub-scanning direction. In addition, the document 51 and the CCD linear sensor 54 including the optical system 53 are arranged such that they can be moved relative to each other in the sub-scanning direction. The CCD linear sensor according to the embodiment described above is used for the CCD linear sensor 54.

The output signal of the CCD linear sensor 54 is subjected to signal processing such as CDS (correlated double sampling) by an analog signal processing circuit 55, is converted to a digital signal by an AD converter 56, and is then supplied to a digital signal processing circuit 57 including memories and so forth. With the digital signal processing circuit 57, in the CCD linear sensor according to the embodiment described above, various signal processing such as checking processing of the black reference using the dummy signals which are inserted in the output signal of the color side, and synthesis processing of the two output signals, which are cut off by extracting the dummy signals, is performed.

In this manner, the CCD linear sensor according to the embodiment described above is used for the image sensor in the digital-color copying machine, that is, in the CCD linear sensor 54, for example, in the case of a structure in which a monochrome sensor and a color sensor having different transfer speeds are mounted on the same chip, it is possible to completely eliminate the influence of noise, which originates from the second read-out pulse of the black and white sensor, on the output signal of the color side. Thus, scanning of a color document can be performed with high precision.

Here, a description is given of the case where the CCD linear sensor is applied to a digital-color copying machine; however, as described above, the CCD linear sensor can be applied to an image-input device such as a facsimile, and as an image sensor of an image scanner in order to input image for display by a personal computer and so on. In these cases, the same advantages as in the case of applying the CCD linear sensor to the digital-color copying machine can be obtained.

As described above, according to the present invention, in the solid-state image sensing device having a plurality of sensors or the image scanner having an image sensor to which the image sensing device is applied, when the plurality of sensors perform reading of signal charge at different timing, by stopping transfer of the signal charge of the other sensor during the reading period of one sensor, a valid pixel signal is not output from the other sensor during this period. As a result, it is possible to completely eliminate the influence of the noise which arises from the read-out operations of one of the sensors upon the output signal of the other sensor.

What is claimed is:
1. A solid-state image sensing device comprising:
a plurality of groups of line sensors devices, each of the group of sensor devices comprises at least one line of pixels and at least one charge-transfer part for further transferring signal charges read-out from each pixel of the line of pixels; and wherein a time in which it takes to read-out signal charges from each pixel in the pixel line and transfer the charges to one end of the charge-transfer part is different for at least one of said groups of sensor devices out of said plurality of groups of line sensors devices; and driving means which, during a read-out period of a first group of line sensors devices, stops charge-transfer driving of the signal charge of a second group of sensor devices.

2. A solid-state image sensing device according to claim 1, wherein said groups of sensor devices are formed on the same chip.

3. A solid-state image sensing device according to claim 1, wherein said time in which it takes to read-out signal charges from each pixel in the pixel line and transfer the charges to one end of the charge-transfer part is different for each group of sensor devices.

4. A solid-state image sensing device according to claim 1, wherein said driving means further comprises charge-transfer driving of at least a final transfer stage of the charge-transfer part in said first group(s) of sensor devices during the period when the remainder of the charge-transfer driving of the signal charge in said second group(s) of sensor devices is stopped.

5. A solid-state image sensing device according to claim 1, wherein said driving means further comprises restarting of transfer driving of the signal charge in said second group(s) of sensor devices in accordance with the output timing of said first group of sensor devices.

6. A solid-state image sensing device according to claim 1, wherein the pixels of said first group of sensor devices and said second group of sensor devices comprise photodetectors.

7. A method for driving a solid-state image sensing device, the image sensing device comprising a plurality of groups of line sensor devices, each of the group of line sensor devices comprises at least one line of pixels and at least one charge-transfer part for further transferring a signal charges read-out from each pixel of the line of pixels, wherein a time in which it takes to read-out signal charges from each pixel in the pixel line and transfer the charges to one end of the charge-transfer part is different for at least one of said groups of sensor devices out of said plurality of groups of line sensor devices, the driving method comprises stopping transfer driving of the signal charge of a second group of line sensor devices during a read-out period of a first group of line sensor devices.

8. A method for driving a solid-state image sensing device according to claim 7, wherein said groups of sensor devices are formed on the same chip.

9. A method for driving a solid-state image sensing device according to claim 7, wherein said time in which it takes to read-out signal charges from each pixel in the pixel line and transfer the charges to one end of the charge-transfer part is different for each group of sensor devices.

10. A method for driving a solid-state image sensing device according to claim 7, wherein charge-transfer driving of at least a final transfer stage of the charge-transfer part in said first group of sensor devices is continued during the period when the transfer driving of the signal charge in second group of sensor devices is stopped.

11. A method for driving a solid-state image sensing device according to claim 7, wherein restarting of transfer driving of the signal charge in said second group of sensors is in accordance with the output timing of said first group of sensor devices.

12. A method for driving a solid-state image sensing device according to claim 7, wherein the pixels of said first group of sensor devices and said second group of sensor devices comprise photodetectors.

13. An image scanner comprising a solid-state image sensing device for an image sensor to read a document image, the solid-state image sensing device comprising:

a plurality of groups of line sensor devices, each of the group of line sensors devices comprises a line of pixels and a charge-transfer part for further transferring signal charges read-out from each pixel of the line of pixels; and wherein a time in which it takes to read-out signal charges from each pixel in the pixel line and transfer the charges to one end of the charge-transfer part is different for at least one of said groups of sensor devices out of said plurality of groups of line sensors devices; and driving means which, during a read-out period of a first group of line sensors devices, stops charge-transfer driving of the signal charge of a second group of line sensors devices.

14. An image scanner according to claim 13, wherein the pixels of said first group of sensor devices and said second group of sensor devices comprise photodetectors.

* * * * *